United States Patent [19]

Koutsky

[11] 4,186,963
[45] Feb. 5, 1980

[54] UPRIGHT VEHICLE SEAT SUPPORT
[75] Inventor: L. John Koutsky, Milan, Ill.
[73] Assignee: Sears Manufacturing Company, Davenport, Iowa
[21] Appl. No.: 956,776
[22] Filed: Nov. 1, 1978
[51] Int. Cl.² .............................................. B60N 1/02
[52] U.S. Cl. .................................... 297/308; 297/345; 248/576; 248/581
[58] Field of Search ............... 297/307, 308, 309, 345; 248/379, 610, 602, 612, 580, 581, 575, 576

[56] References Cited
U.S. PATENT DOCUMENTS

| | | | |
|---|---|---|---|
| 602,788 | 4/1898 | Westland | 297/307 |
| 1,568,211 | 1/1926 | Conwell | 297/345 X |
| 1,905,588 | 4/1933 | Harris | 297/308 |
| 2,859,063 | 11/1958 | Underland | 297/308 X |
| 3,705,745 | 12/1972 | Ambrosius | 248/575 |
| 3,861,637 | 1/1975 | DeLongchamp | 248/581 X |
| 3,954,298 | 5/1976 | Lowe | 297/308 |
| 3,999,733 | 12/1976 | Harder et al. | 297/345 |

Primary Examiner—Francis K. Zugel
Attorney, Agent, or Firm—Henderson & Sturm

[57] ABSTRACT

This invention relates to supports, for vehicle seats, having a generally upright configuration. Provision of a plurality of seat adjustments, for operator comfort and safety, performable with an economy of movement and structure which tends to maximize free, usable space within a vehicle cab, is achieved by the invention. A housing member (13) has facing traces (17), and a carriage member (14) bears the seat and a plurality of rollers (51, 53) which engage the traces (17). A bracket assembly (15), disposed between housing and carriage members (13, 14), is selectively slidable with respect to the carriage member (14) to effect height adjustment and, when locked with respect to the carriage member (14), is operable upon to effect weight adjustment.

7 Claims, 8 Drawing Figures

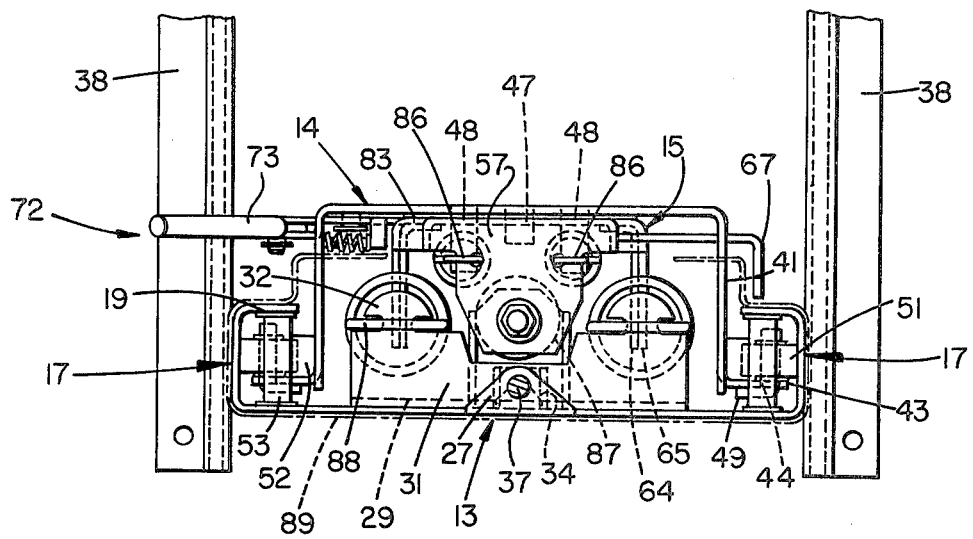
FIG. 2
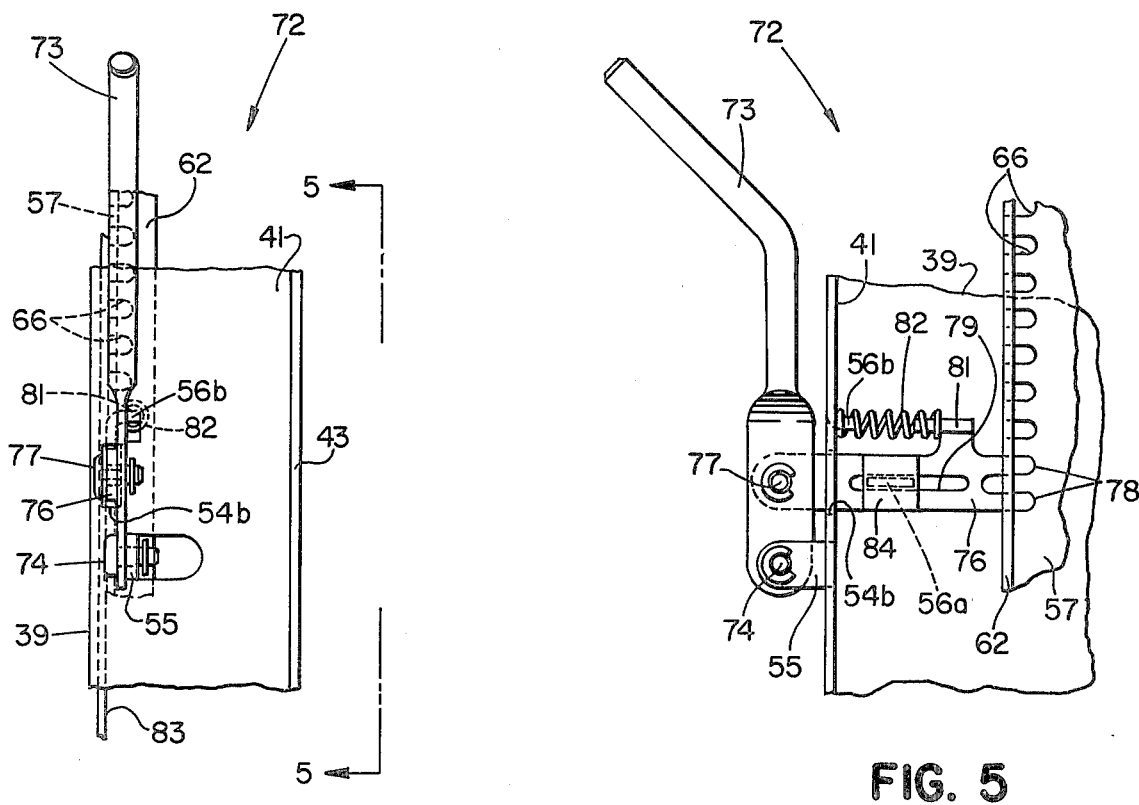
FIG. 4
FIG. 5

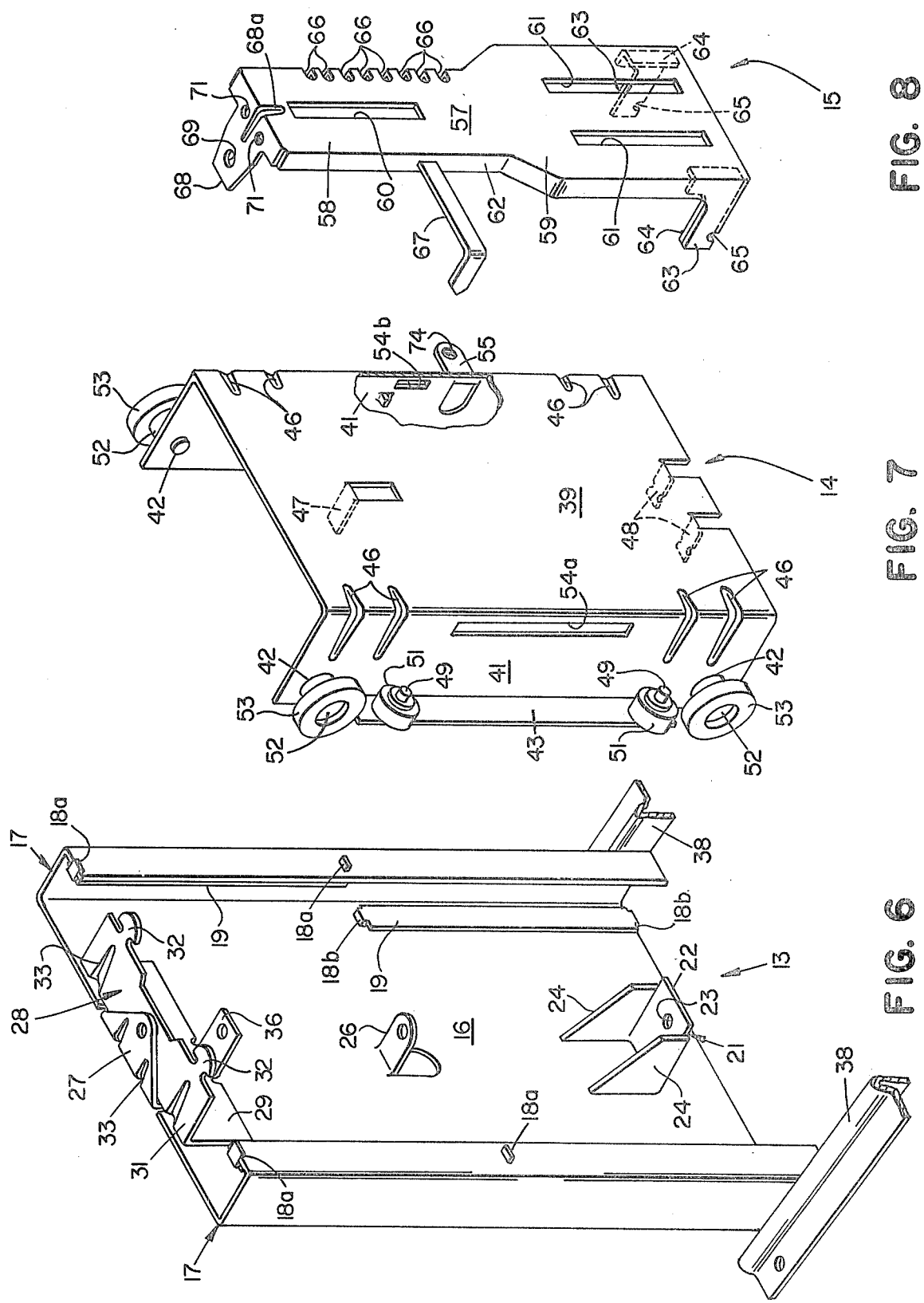

UPRIGHT VEHICLE SEAT SUPPORT

DESCRIPTION

BACKGROUND OF THE INVENTION

This invention relates to supports for vehicle seats. More particularly this invention is concerned with generally upright suspension structures for vehicle seats.

Maintaining the comfort, safety and effectiveness of the operator of a vehicle is a continuing problem, particularly for work vehicles such as tractors and other off-road type vehicles where the vehicle is very likely to be jolted by uneven terrain during operation. Upright seat suspension structures for such vehicles have been devised; however, weight adjustment and height adjustment features have been incorporated into such structures only by employing space-consuming constructions.

DISCLOSURE OF INVENTION

The upright vehicle seat support of this invention includes an upright roller housing which is affixed to the vehicle. Roller traces are formed along the longitudinal edges of the roller housing. A roller carriage bears the vehicle seat and includes a plurality of rollers for guiding vertical and against transverse movement of the carriage and seat. The rollers travel within the roller traces. A bracket assembly is disposed between the roller carriage and roller housing and is slidably juxtaposed against the roller carriage. A latch structure is borne by the roller carriage and bracket assembly and is operable to fix the carriage and bracket in a selected relationship. Suspension members operate through the bracket assembly upon the seat. Movement of the roller carriage with respect to the bracket assembly effects height adjustment.

It is an object of this invention to provide an upright support for a vehicle seat which effectively suspends the seat and allows for weight and height adjustment thereof.

Another object of this invention is to provide an upright seat support which minimizes fore-aft motion of the seat through the suspension travel range.

Also an object of this invention is to provide an upright support with roller carriage and housing which more efficiently guide vertical motion, and guide against transverse motion, of the vehicle seat.

Provision of a bracket assembly and roller carriage which more efficiently effects height adjustment of the seat, while accurately transmitting suspension and weight adjustment to the seat, is also an object of this invention.

Still another object of this invention is to provide an upright vehicle seat which is more compact and maximizes the amount of usable space in the vehicle cab.

These objects and other features and advantages of the upright vehicle seat support of this invention will become readily apparent upon referring to the following description, when taken in conjunction with the appended drawing.

BRIEF DESCRIPTION OF DRAWINGS

The upright vehicle seat support of this invention is illustrated in the drawing wherein:

FIG. 2 is a top plan view of the upright support, the cover having been removed;

FIG. 4 is an enlarged, fragmentary rear elevational view, taken along line 4—4 in FIG. 3, showing details of the latch assembly;

FIG. 5 is an enlarged, fragmentary rear elevational view taken along line 5—5 in FIG. 4;

FIG. 6 is an enlarged, isometric view of the roller housing;

FIG. 7 is an enlarged, isometric view of the roller carriage; and

FIG. 8 is an enlarged, isometric view of the height adjustment bracket.

BEST MODE FOR CARRYING OUT THE INVENTION

Figure 1:
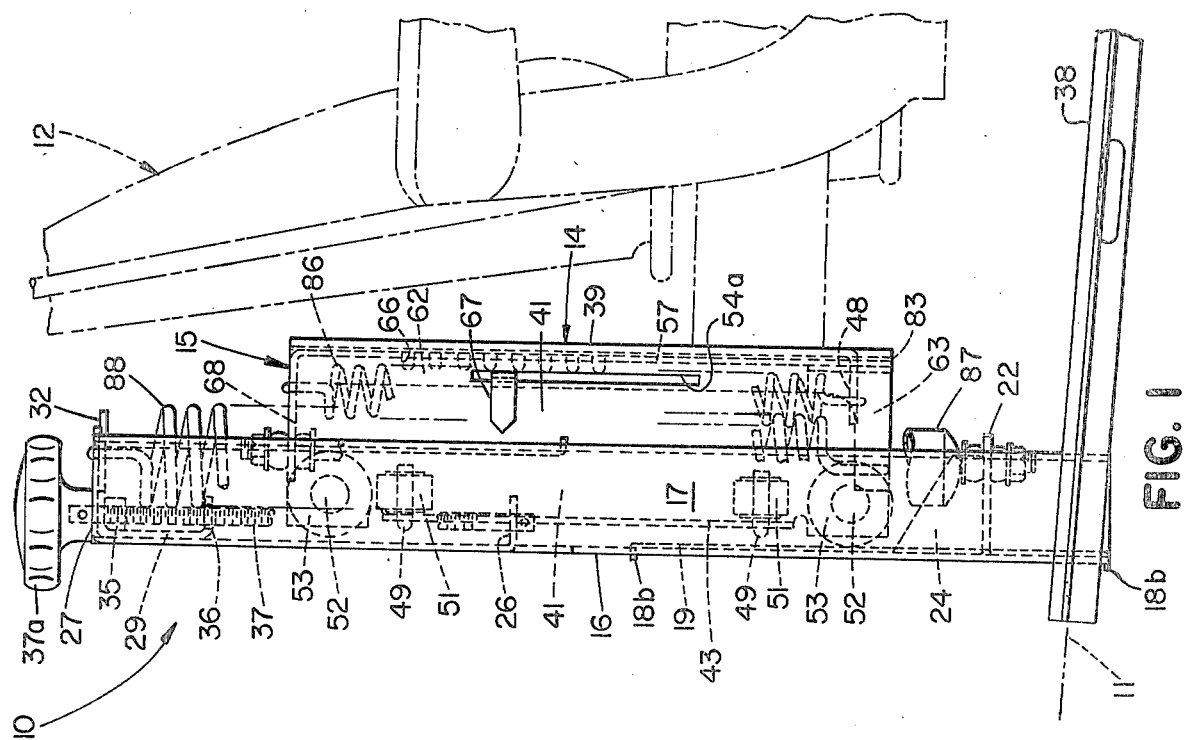
FIG. 1 is a side elevational view of the upright support of this invention.

The upright vehicle seat support of this invention is shown generally at 10 in FIG. 1 mounted on a vehicle 11 and bearing a seat 12. The upright seat support 10 more particularly includes a roller housing 13, roller carriage 14 and height adjustment bracket assembly 15.

The roller housing 13 (FIGS. 2, 3 and 6) includes a generally rectangular main plate 16. Along the longitudinal edges of the main plate 16 are formed U-shaped roller traces 17. The traces 17 open toward each other, and each trace 17 has two upper notches 18a and two lower notches 18b formed therein. Two roller spring plates 19 are disposed within each trace 17, each plate 19 extending between either upper notches 18a or lower notches 18b. The upper plates 19, extending between notches 18a, are disposed adjacent, and along about half the length of, the forward (seat 12-facing) walls of the roller traces 17. The lower plates 19, extending, between notches 18b, are disposed adjacent, and along about half the length of, the rearward-facing walls of the roller traces 17. A lower shock mounting bracket 21 is substantially U-shaped, attached to the front (seat 12-facing) side of the plate 16 intermediate the traces 17, and upwardly opening. A center portion 22 thereof, having an aperture 23 formed therethrough, extends between side portions 24. A middle tab 26, having a central aperture, extends from the front side of plate 16 and is disposed intermediate the traces 17 and approximately midway between the top and bottom of plate 16. An upper tab 27, also having a central aperture, is joined at the top edge of the plate 16 between traces 17 and in alignment with middle tab 26 and mounting bracket 21.

A spring carrier 28 is disposed against the main plate 16 below the upper tab 27. The carrier 28 includes a back plate 29, disposed adjacent the front surface of the main plate 16, and a top plate 31 joined normal to the upper edge of plate 29 and extended away from plate 16. Adjacent each end of the top plate 31 is formed a spring-bearing projection 32. Associated with each projection 32 is a formed reinforcement 33 which extends transversely of the back and top plates 29, 31. Between the reinforcements 33 is located a cut-out area 34. A square threaded nut 35 is affixed to the underside of top plate 31 adjacent area 34. A tab 36 is joined at the bottom edge of back plate 29 and has a central aperture formed therethrough, which aperture is aligned with area 34 and nut 35.

A threaded weight adjustment screw 37 passes through apertured upper tab 27 and the cut-out area 34, is threaded through nut 35, and passes through tab 36. A knob 37a is attached to the end of the screw 37 extending above upper tab 27 and abuts the top surface of tab 27, a thrust bearing (not shown) being disposed therebetween. The lower end of screw 37 passes through tab 26, and a roll pin 37b, disposed transversely through screw 37 below tab 26, additionally secures the screw 37. A pair of slide mounting brackets 38 are affixed to the bottom end of main plate 16, each bracket 38 being disposed adjacent a trace 17. The brackets 38 slidably engage structures (not shown) attached to the vehicle 11 to permit fore-aft adjustment of the support 10 bearing seat 12. It is preferred that the main plate 16 be attached to the mounting brackets 38 at a small angle from the vertical, the front face of plate 16 facing slightly upwardly.

The roller carriage 14 (FIGS. 3 and 7) also includes a rectangular main plate 39. The seat 12 is attached to the front surface of plate 39, as by brackets, and the rear surface of plate 39 faces the roller housing main plate 16. Joined normal to the longitudinal edges of the plate 39 are side members 41. Attachment areas 42 are disposed on, adjacent opposite ends of, and adjacent the free longitudinal edge of, member 41. A flange 43 is joined normal to the free longitudinal edge of each side 41 and extends to the side of member 41 opposite from main plate 39. Two notches 44 are cut into each flange 43, the notches 44 being disposed adjacent opposite ends of the flange 43. A plurality of reinforcements 46 are formed and extend transversely of the main plate 39 and sides 41. Each reinforcement 46 is associated with an attachment area 42 or notch 44. A middle guide 47 and two lower guides 48 are formed normal to the rear surface of plate 39, guide 47 being disposed intermediate the sides 41 and guides 48 being disposed equidistant from the longitudinal axis of plate 39.

Four L-shaped spot weld pins 49 are attached to the flanges 43, each pin 49 projecting through a notch 44, being parallel to the sides 41 and extending away from the flange 43 toward plate 39. A side roller 51 is rotatably mounted on the projecting portion of each pin, being held thereon as by push nuts. Four roller bearing stub shafts 52 are attached normal to the side members 41, each shaft 52 being attached, as by welding, at an attachment area 42. The stub shafts 52 extend to the same side of members 41 as the flanges 43. Ball bearing structures 53 are pressed onto the extended ends of the stub shafts 52, being held thereon as by push nuts, and are rotatable in planes normal to the plane defined by the side rollers 51.

An elongated, longitudinal slot 54a, is cut into one side member 41, and a shorter longitudinal slot 54b into the other side member 41, both adjacent the juncture of plate 39 with the respective side 41. These slots 54a, 54b, as explained hereinafter, have a weight adjustment function. Mounting tabs 55, 56b are formed from the other side member 41 adjacent its juncture with plate 39, and tab 56a is formed from plate 39. The tabs 55, 56a, 56b are disposed approximately intermediate the ends of the other side member 41, the tabs 55, 56a, 56b extending to opposite sides of member 41, tabs 56a, 56b being disposed on the same side of member 41 as plate 39. These tabs 55, 56a, 56b function with the height adjustment bracket assembly 15 as described hereinafter.

The height adjustment bracket assembly 15 (FIGS. 3 and 8) includes an elongated main plate 57 having an upper, narrower portion 58 contiguous with a lower, wider portion 59. An upper elongated slot 60 is cut into, and disposed along the longitudinal axis of, the upper portion 58. Lower elongated slots 61 are cut into the lower portion 59 and disposed parallel to, and equidistant from, the longitudinal axis of lower portion 59. The longitudinal axes of portions 58, 59 are in alignment. Side members 62 are joined normal to the longitudinal edges of main plate 57. The side members 62 have a generally uniform width, but, adjacent the free end of portion 59 (lower end of plate 57), the sides 62 have portions 63 which project a greater distance from the surface of plate 57. Reinforcement brackets 64 are attached to the projecting portions 63 and extend to attachment with plate 57. A notch 65 is cut into each portion 63 and associated bracket 64, the notches 65 being cut into the transverse edges defining the bottom end of the sides 62 and being disposed away from the plate 57.

A plurality of slots 66 are arranged along the juncture of upper portion 58 and one of the side members 62, each slot 66 being cut into both the portion 58 and the side 62. The slots 66 are uniformly spaced. An L-shaped pointer 67 is attached normal to the opposite side member 62, extending first away from the sides 62 and parallel to plate 57 and then extending away from plate 57 in the same direction as portions 63.

A support bracket 68 is joined normal to the free end of portion 58 (upper end of plate 57). The bracket 68 and side members 62 extend to the same side of plate 57, the bracket 68 extending substantially as far as the portions 63 extend from plate 57. A larger aperture 69 is formed through, adjacent the extended end of, bracket 68, the aperture 69 being disposed intermediate the sides 62. Two smaller apertures 71 are formed through the bracket 68 adjacent the juncture with plate 57. The apertures 71 are disposed at equal distances on opposite sides of a line defined by the diameter of aperture 69 normal to plate 57.

A latch assembly 72 is also part of the height adjustment bracket assembly 15. The assembly 72 includes a lever or handle 73 pivotally attached at 74 to tab 55 and disposed parallel to main plate 39. A slot is disposed along the longitudinal axis of the lever 73 at 77 adjacent pivot attachment 74. The assembly 72 also includes a latch 76, one end of which is pivotally attached at slot 77. The latch 76 extends through slot 54b. A plurality of uniformly spaced teeth 78 extend from the opposite end of the latch 76. An elongated guide slot 79 is disposed along the longitudinal axis of latch 76, and tab 56a extends through the slot 79. A projection 81 extends from the latch 76 adjacent the teeth 78, and a return spring 82 extends between tab 56b and projection 81.

During assembly, a spacer bearing pad 83 (FIG. 1), having the general conformation of the main plate 57, is placed over the rear surface of main plate 39, the guides 47, 48 passing through slots cut into the pad 83. The main plate 57 is oriented to pass the pointer 67 through slot 54a. Thereafter, the middle and lower guides 47, 48 are positioned through the upper and lower slots 60, 61 respectively. The latch assembly 72 may now be assembled onto the tabs 55, 56a, 56b, or, if already assembled thereon, the lever 73 may be released such that the teeth engage the notches 66. The main plate 57 of bracket assembly 15 is now juxtaposed against the main plate 39 of the roller carriage 14, the bearing pad 83 separating the two. The sides 62, 41 are parallel and extend in the same direction from the plates 57, 39, the sides 62 being disposed between sides 41.

Square washer members 84 are attached over the portions of the guides 47, 48 projecting beyond the plate 57 and the portion of tab 56a projecting beyond latch 76. A pair of helper springs 86 are then attached, each spring 86 extending between the apertures 71 of support bracket 68 and the lower guides 48. The helper springs 86 are disposed between the sides 61 and are generally separated from plate 39 by plate 57. The height adjustment bracket assembly 15 and the roller carriage 14 are now connected. One end of a shock absorber 87 is pivotally attached at the aperture 23 of mounting bracket 21. The upper ends of the two main suspension springs 88 are attached to the spring-bearing projections 32 of the spring carrier 28. The connected roller carriage 14 and bracket assembly 15 are elevated, and the side rollers 51 and ball bearing structures 53 are guided into the roller traces 17. The outer races of the ball bearing structures 53 engage the facing roller spring plates 19 within each trace 17, and the side rollers 51 engage the surfaces of the traces 17 extending between the plates 19. The lower ends of the suspension springs 88 are attached at the notches 65, and the other end of the shock absorber 87 is attached at aperture 69 of support bracket 68. The sides 62, 41 extend toward main plate 16, and the traces 17 generally extend toward plates 39, 57. The traces 17 and side members 41 overlap when viewed from the side. The suspension springs 88 and shock absorber 87 are disposed between side members 41 and between plates 16, 57. The roller carriage 14 and bracket assembly 15 are now connected to the roller housing 13. As indicated in FIG. 2, a cover plate 89 may be attached to the rear surface of the roller housing main plate 16 and the outside surface of the traces 17 thereof. The vehicle seat 12 is attached, as by brackets, to the front surface of the roller carriage main plate 39. The support 10 with seat 12 is then attached to the vehicle 11.

The side rollers 51 and spacer pad 83 are formed by known methods from a high density polyethylene or other suitable material. Other components of the support 10 may be formed of suitable steels, harder, stronger steels being employed for certain components as the slide mounting brackets 38, the roller spring plates 19, the spot weld pins 49 and the roller bearing stub shafts 52. These components are formed by cutting, bending and other techniques well known in the art of steel working. Components of the support 10 are attached together by welding and other techniques known in the art.

The upright seat support 10 is adjusted once the vehicle operator has positioned himself in the seat 12. Weight adjustment is effected by grasping the knob 37a and rotating the weight adjustment screw 37. The spring carrier 28 moves longitudinally with respect to the screw 37, thereby appropriately pretensioning the suspension springs 88 such that the seat 12 is disposed at the midpoint of its vertical travel range when the operator is positioned in the seat 12. During weight adjustment the latch teeth 78 engage the slots 66, and the roller carriage 14 and height adjustment bracket assembly 15 are held in fixed relationship.

Height adjustment of the seat 12 is effected by grasping the lever 73 and pivoting it about point 74. The lever 73 acts on latch 76 at 77 to draw the teeth 78 from engagement with the slots 66. The guide tab 56a travels in slot 79 keeping the latch 76 properly oriented with respect to the plurality of slots 66. The roller carriage 14 may now move with respect to the bracket assembly 15, the roller carriage main plate 39 and bearing pad 83 becoming slidable with respect to the bracket assembly main plate 57.

The roller carriage 14 is moved such that the seat 12 is disposed at a height above the vehicle 11 comfortable for the operator. The side rollers 51 and ball bearing structures 53 run within the traces 17, and the bracket assembly plate 57 slides over the roller carriage plate 39 and pad 83. The middle and lower guides 47, 48 travel within the slots 60, 61 to keep the roller carriage 14 and bracket assembly 15 properly oriented with respect to each other during this movement. The weight of the operator upon the seat 12 may be employed to move the carriage 14 downwardly with respect to the bracket assembly 15; whereas, the operator may lift off of the seat 12 and allow the helper springs 86 to operate to move the carriage 14 upwardly with respect to the bracket assembly 15. After the roller carriage 14, bearing the seat 12, has been most advantageously positioned, the lever 73 is released. The return spring 82 then acts to force the latch teeth 78 back into engagement with the slots 66. The roller carriage 14 and bracket assembly 15 are again held in fixed relationship.

Figure 3:
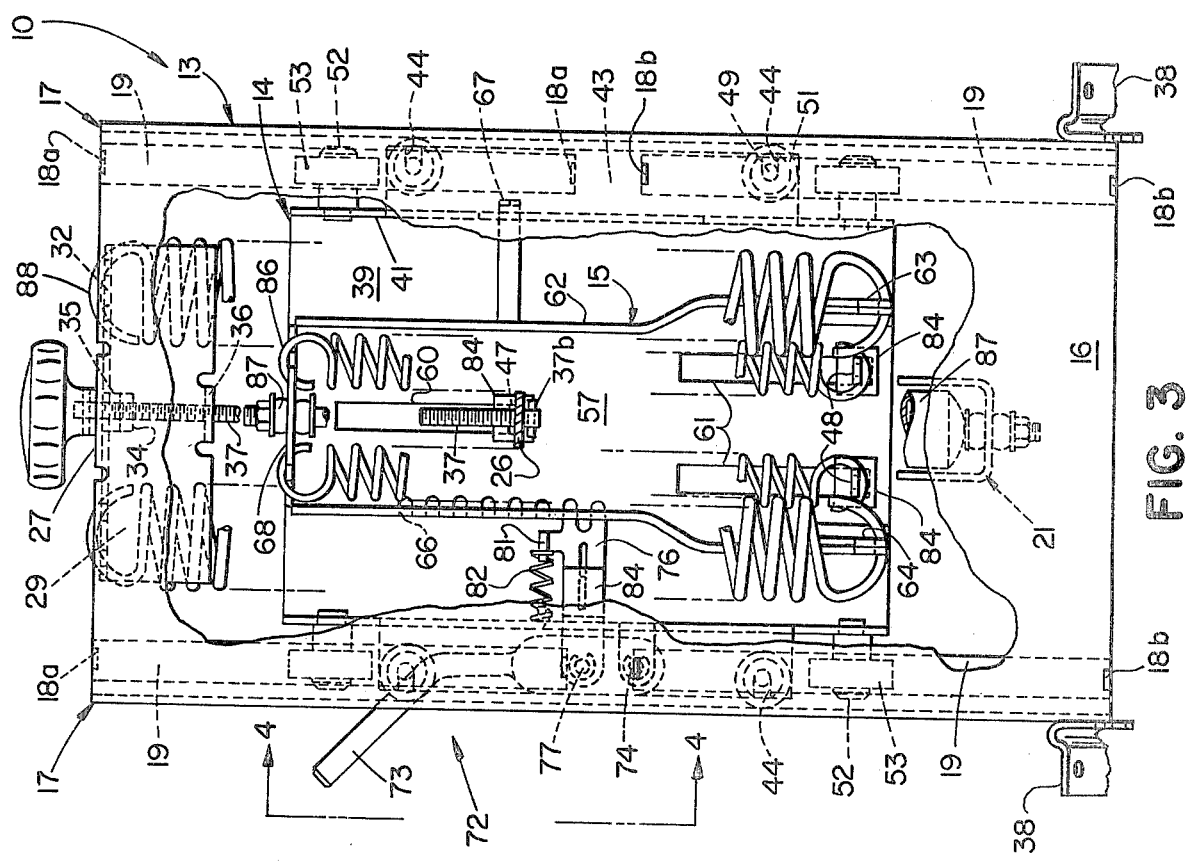
FIG. 3 is a rear elevational view of the upright support, some major components thereof being indicated in dotted lines.

The traces 17 of the roller housing 13 guide the vertical movement of the roller carriage 14. The ball bearing structures 53 primarily carry the roller carriage 14 while the rollers 51 guide against side to side movement by the carriage 14. The spring plates 19 minimize wear to the traces 17. When the support 10 is in use, the springs 88 provide suspension for the joined roller carriage 14 and bracket assembly 15 bearing the seat 12 during the guided vertical movement thereof, the shock absorber 87 providing damping and also controlling the stroke by providing the up and down stops for this suspension movement. In FIG. 3 the roller carriage 14 and bracket assembly 15 are shown in fixed relationship and at the top position of suspension travel, the bracket assembly 15 being fixed with respect to the roller carriage 14 at the low position of height adjustment. As an example, a support 10 might have a suspension travel of 4 inches (around 10 cm) and a height adjustment travel of 3 inches (about 7.6 cm) in increments of ½ inch (about 1.3 cm), the seat 12 having a fore-aft movement of about ½ inch (about 1.3 cm) through the suspension travel, the roller housing 13 being disposed at an angle about 7° from normal with respect to the vehicle 11. A weight adjustment scale (not shown) may be disposed on the trace 17, or portion of the cover plate 89 thereover, over which the pointer 67 travels.

The latch assembly 72 is readily accessible and of a compact size, being carried by those structures upon which it operates. The roller housing 13, being at an angle from the vertical, provides for a conservation of space between the support 10 and seat 12. The facing roller housing 13 and roller carriage 14 overlap to enclose and protect the suspension and other operating components of the support 10. The roller housing 13 and roller carriage 14 engage in an efficient manner to provide guidance for vertical movement, and against transverse movement, of the seat 12. The roller carriage 14 and height adjustment bracket 15 nest in an efficient manner to further enclose and protect operating components of the support 10 and provide superior guidance to the height adjustment movement. In general, a more efficient, contained, compact upright seat support 10 is provided which maximizes the amount of free, usable space within a vehicle cab.

Although a preferred embodiment has been disclosed herein, it is to be remembered that various modifications and alternate constructions can be made thereto without departing from the full scope of the invention, as defined in the appended claims.

I claim:

1. A support for a vehicle seat, comprising: roller housing means mountable on the vehicle and extending upright therefrom and including an upright rear main plate disposed transversely to the length of the vehicle and a pair of transversely spaced apart upright roller traces joined to transversely opposite sides of the main plate, each roller trace being of U-shaped section as viewed from above and having their open sides facing toward each other, each roller trace having an upright, laterally in-turned front flange parallel to and spaced ahead of the main plate; upright carriage means of U-shaped section as viewed from above and having an upright front main plate parallel to and spaced ahead of the roller housing means and a pair of parallel upright side members joined to the carriage means front wall and spaced apart transversely a distance less than that of the aforementioned roller trace flanges, said side members extending rearwardly from the carriage means front plate and between and respectively closely adjacent to the roller traces, each side member having an upright laterally out-turned flange entering the proximate roller trace; first roller means carried by the carriage means flanges on fore-and-aft axes for rolling along the respective roller traces; second roller means carried by the carriage means flanges on transverse axes for rolling along the respective roller flanges; an upright height adjustment bracket disposed closely along the rear face of the carriage means main plate; means mounting the bracket means on the carriage means for relative vertical movement; means cooperative between the carriage means and bracket means for selectively locking and releasing the bracket means against and for such vertical movement; helper spring means connected between the bracket means and carriage means and biasing the bracket means upwardly; and suspension spring means connected between the bracket means and the roller housing means for biasing the bracket means and carriage means upwardly as a unit when the locking and releasing means is locked.

2. The support defined in claim 1, including the further feature that the helper and suspension spring means are vertically disposed, coiled tension springs positioned intermediate the bracket means and the roller housing and laterally intermediate the upright side members of the carriage means.

3. The support defined in claim 2, including the further feature that the bracket means includes an upper, central, rearwardly projecting portion; the roller housing means includes a lower, forwardly projecting portion in vertical alinement with said rearwardly projecting portion; and upright shock-absorber means is connected at opposite ends respectively to said portions.

4. The support of claim 2, including, the further feature that there are a pair of suspension springs spaced laterally apart, one at each side of a fore-and-aft plane through the vertical centerline of the support.

5. The support of claim 4, including the further feature that there are a pair of helper spring means spaced laterally apart and respectively laterally inwardly of and closely adjacent to the suspension spring means.

6. The support of claim 5, including the further feature that the lower part of the bracket means has a pair of laterally spaced apart portions projecting rearwardly toward the carriage means and connected to the bottom of the suspension spring means and the upper ends of the suspension spring means are connected to an upper portion of the roller housing means.

7. The support defined in claim 6, including the further feature that the lower part of the front main plate of the carriage means includes a pair of laterally spaced apart portions projecting rearwardly toward the main rear plate of the roller housing means and connected to the bottoms of the helper spring means, and the bracket means includes an upper portion projecting rearwardly and vertically alined with said pair of portions and connected to the upper ends of the helper springs.

* * * * *